(12) United States Patent
Halverson

(10) Patent No.: US 10,895,406 B1
(45) Date of Patent: Jan. 19, 2021

(54) SOLAR CONCENTRATOR

(71) Applicant: Daryll Halverson, Eloy, AZ (US)

(72) Inventor: Daryll Halverson, Eloy, AZ (US)

( * ) Notice: Subject to any disclaimer, the term of this patent is extended or adjusted under 35 U.S.C. 154(b) by 74 days.

(21) Appl. No.: 16/178,297

(22) Filed: Nov. 1, 2018

Related U.S. Application Data

(60) Provisional application No. 62/580,823, filed on Nov. 2, 2017.

(51) Int. Cl.
| | |
|---|---|
| *F24S 20/20* | (2018.01) |
| *F24S 23/75* | (2018.01) |
| *F24S 23/79* | (2018.01) |
| *F24S 23/00* | (2018.01) |
| *F24S 30/40* | (2018.01) |
| *F24S 40/55* | (2018.01) |
| *F24S 23/70* | (2018.01) |
| *G02B 19/00* | (2006.01) |

(52) U.S. Cl.
CPC ............... *F24S 20/20* (2018.05); *F24S 23/12* (2018.05); *F24S 23/75* (2018.05); *F24S 23/79* (2018.05); *F24S 30/40* (2018.05); *F24S 40/55* (2018.05); *F24S 2023/833* (2018.05); *G02B 19/0042* (2013.01)

(58) Field of Classification Search
CPC .................................. F24S 23/79; F24S 23/75
See application file for complete search history.

(56) References Cited

U.S. PATENT DOCUMENTS

| | | | |
|---|---|---|---|
| 4,286,581 A | 9/1981 | Atkinson, Jr. | |
| 4,297,000 A * | 10/1981 | Fries | ........................ F21S 11/00 362/557 |
| 4,313,024 A | 1/1982 | Horne | |
| 4,395,582 A * | 7/1983 | Damsker | ................ H02S 40/44 136/248 |
| 7,797,939 B2 | 9/2010 | Green | |
| 8,770,186 B2 | 7/2014 | Clue | |
| 8,776,784 B2 | 7/2014 | Bennett | |
| 9,000,293 B2 | 4/2015 | Caparros Jimenez | |
| 9,127,822 B2 | 9/2015 | Hutson et al. | |
| 9,225,015 B2 | 12/2015 | Lee et al. | |

(Continued)

FOREIGN PATENT DOCUMENTS

EP        0194820 A2 *  9/1986   ............. H01Q 19/18

*Primary Examiner* — Jorge A Pereiro
(74) *Attorney, Agent, or Firm* — Invention To Patent Services; Alex Hobson

(57) ABSTRACT

A solar concentrator utilizes an arrangement of an outer reflective ring around a centrally located inner reflective cone to concentrate light. The reflective surface of the outer reflective ring is substantially 45 degrees from a transmitted light source. Light from the light source is reflected off of the outer reflective ring to produce a reflected light having a light reflective axis. The reflected light is directed toward the inner reflective cone and is reflected off of the reflective surface of the inner reflective cone as transmitted light toward a light receiver. The reflective surface of the inner reflective cone is configured at 45 degrees from the light reflective axis. The light receiver may convert the transmitted light into electricity or heat a fluid or other article. A solar tracker may be used to keep the central axis of the solar concentrator aligned with the sun.

20 Claims, 3 Drawing Sheets

(56) References Cited

U.S. PATENT DOCUMENTS

| | | | | |
|---|---|---|---|---|
| 2002/0139414 A1* | 10/2002 | Vasylyev | F24S 23/70 | 136/246 |
| 2005/0046977 A1* | 3/2005 | Shifman | G02B 17/061 | 359/853 |
| 2006/0174867 A1* | 8/2006 | Schaafsma | F24S 23/70 | 126/683 |
| 2008/0000516 A1* | 1/2008 | Shifman | H01L 31/0547 | 136/246 |
| 2008/0092877 A1* | 4/2008 | Monsebroten | F21S 11/00 | 126/683 |
| 2008/0137205 A1* | 6/2008 | Spencer | G02B 19/0042 | 359/601 |
| 2008/0163922 A1* | 7/2008 | Home | G02B 19/0042 | 136/248 |
| 2010/0084017 A1* | 4/2010 | Walden, Sr. | G01S 3/7861 | 136/259 |
| 2011/0100456 A1* | 5/2011 | Walden | G01S 3/7861 | 136/259 |
| 2012/0042652 A1* | 2/2012 | Tarabishi | F03G 6/065 | 60/641.15 |
| 2013/0298990 A1* | 11/2013 | Caparros Jimenez | G02B 19/0042 | 136/259 |
| 2014/0086586 A1* | 3/2014 | Voutilainen | H04M 1/003 | 398/115 |
| 2014/0133041 A1* | 5/2014 | Maxey | G02B 7/183 | 359/853 |
| 2014/0326293 A1* | 11/2014 | Jin | F24S 23/80 | 136/246 |
| 2015/0009567 A1* | 1/2015 | Freier | G02B 19/0023 | 359/597 |
| 2015/0301306 A1* | 10/2015 | Corrigan | G02B 7/183 | 359/853 |
| 2017/0074547 A1 | 3/2017 | DiFiglia | | |
| 2017/0131532 A1* | 5/2017 | Dannenberg | F24S 23/79 | |
| 2018/0073774 A1* | 3/2018 | Nordin | F24S 23/79 | |
| 2018/0073776 A1* | 3/2018 | Nordin | F24S 20/20 | |

\* cited by examiner

SOLAR CONCENTRATOR

CROSS REFERENCE TO RELATED APPLICATIONS

This application claims the benefit of priority to U.S. provisional patent application No. 62/580,823 filed on Nov. 2, 2017; the entirety of which is hereby incorporated by reference herein.

BACKGROUND OF THE INVENTION

Field of the Invention

This application is directed to a solar concentrator and in particular a solar concentrator having an outer reflective ring and an inner reflective cone that produces a concentrated beam of light that can be used for any number of uses.

Background

There is a push to use more renewable energy, such as solar energy to produce power. Petroleum based energy systems have limited supply and produce pollution. Nuclear power produces clean energy but also produces waste products that are radioactive. In addition, nuclear power has risks.

SUMMARY OF THE INVENTION

The invention is directed to a solar concentrator that utilizes an arrangement of an outer reflective ring around a centrally located inner reflective cone to concentrate light. The outer reflective ring has a reflective surface that is substantially 45 degrees from a transmitted light source. Light from the light source is reflected off of the outer reflective ring to produce a reflected light having a light reflective axis. The reflected light is reflected substantially orthogonally from the source light, or light source axis. The reflected light is directed toward the inner reflective cone and is reflected off of the reflective surface of the inner reflective cone as transmitted light toward a light receiver. The reflective surface of the inner reflective cone is configured at 45 degrees from the light reflective axis and therefore reflects the reflected light orthogonally to the reflected light. The transmitted light is therefore transmitted substantially in the same axis or direction as the light source axis and may by projected toward or away from the light source. It may be preferred to configure the inner reflective cone with the top, or larger diameter portion toward the light source and therefore project the transmitted light away from the light source. The reflective surfaces of the outer reflective ring and the inner reflective cone extend in a straight line from the bottom to the top, or put another way, are not curved like a parabolic reflector. A parabolic reflector type solar concentrator cannot scale the way the solar concentrator of the present invention can. The outer reflective ring can be large in diameter without changing the inner reflective cone. The orthogonal direction or reflection enables this unique scaling ability.

An exemplary solar concentrator comprises alight receiver which may be a solar converter, wherein the solar energy is converted to electrical power, such as photovoltaic cells. An exemplary light receiver may comprise a fluid, such as water that is heated by the transmitted light and then used in a steam turbine or other processes. The transmitted light may be used as an energy source to produce electricity of heat. Any suitable conversion process and apparatus may be used for this purpose.

An exemplary solar concentrator utilizes the sun as the light source and in order to keep the rays of the sun aligned with the solar concentrator, a solar tractor may be used. Since the light source axis should be kept orthogonal to the light reflective axis a solar tracker may be used to sweep the solar concentrator to keep a central axis aligned with the light source axis.

An exemplary solar concentrator may be scaled to any suitable size and since the light reflected off of the outer ring can travel a long distance without interference to the inner reflective cone, the outer reflective ring may be much larger in diameter than the outer diameter of the inner reflective cone. The outer diameter of the inner reflective cone is proximal to or the top of the inner reflective cone that this may be aligned with the top of the outer reflected ring. The outer reflective ring may have a much larger outer diameter than the outer diameter 65 of the inner reflective cone. The ratio of the diameters of the outer reflective ring to the inner reflective cone may be about 4:1 or more, about 6:1 or more, about 8:1 or more, about 10:1 or more, about 20:1 or more and any range between and including the ratios. Note that the larger the ratio, the more light energy will be concentrated on the inner reflective cone. Therefore, the transmitted beam will have a high luminous intensity. When a large amount, or high intensity of reflected light is incident on the inner reflected cone, a cooling system may be required to prevent damage to the inner reflective cone. A coolant fluid, such as water may be pumped through the interior of the inner reflective cone.

The surface area of the reflective surface of the outer reflective ring may be about 2 $m^2$ or more, about 3 $m^2$ or more, about 5 $m^2$ or more, about 10 $m^2$ or more, about 25 $m^2$ or more, about 50 $m^2$ or more about 100 $m^2$ or more and any range between and including the values provided. The height of the reflective surface of the outer reflective ring and/or the corresponding reflective surface of the inner reflective cone may be about 0.5 m or more, about 1 m or more, about 5 m or more, about 10 m or more, about 20 m or more, about 50 m or more and any range between and including the height values provided. The solar concentrator may be scaled depending on the type of application and use. Large scale solar concentrators wherein the height of the outer reflective ring is more than 5 m may be used for power production for residential communities or municipalities and smaller solar concentrators, with heights less than 5 m or even less than 1 m may be used for power production for a single residence, a production facility and the like.

The inner reflective cone may be configured to extend up from the top of the outer reflective ring to capture and reflect any light that may be reflected slightly off from the light reflective axis. If the light source is not aligned with the central axis of the solar concentrator, the light may be reflected at an offset from the light reflective axis.

Substantially 45 degrees, as used herein means from about 41 to 49 degrees, and preferably from about 43 to 47 degrees, and even more preferably from about 44 to 46 degrees and ideally 45 degrees. If the outer reflective surface is not at 45 degrees, the reflected light will not be projected orthogonally from the light source toward the inner reflective cone.

A light pipe may be configured between the inner reflective cone and the light receiver. An exemplary light pipe may have a reflective surfaces on the interior to further concentrate and direct the transmitted light to the light receiver.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
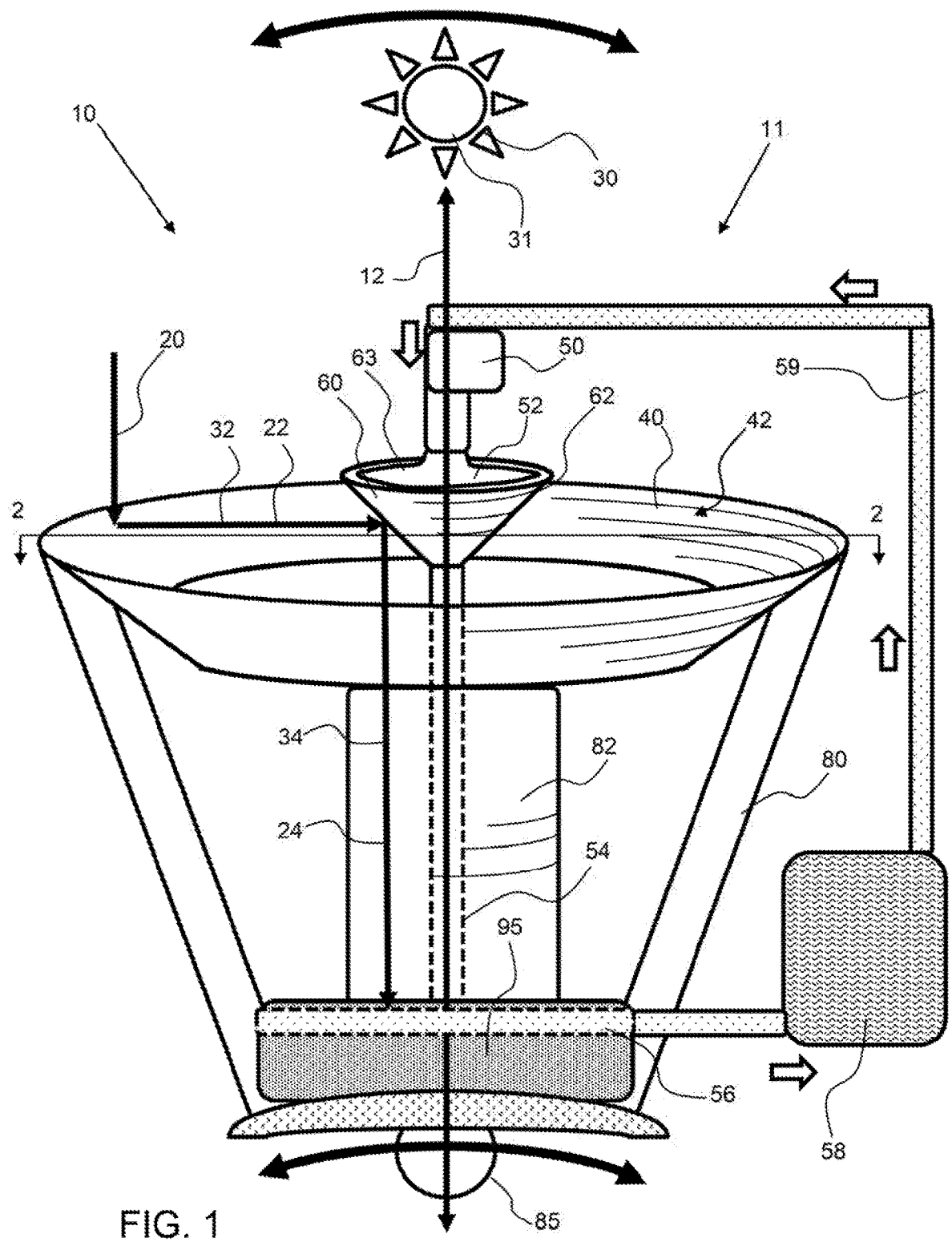
FIG. 1 shows a perspective view of an exemplary solar concentrator of the present invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
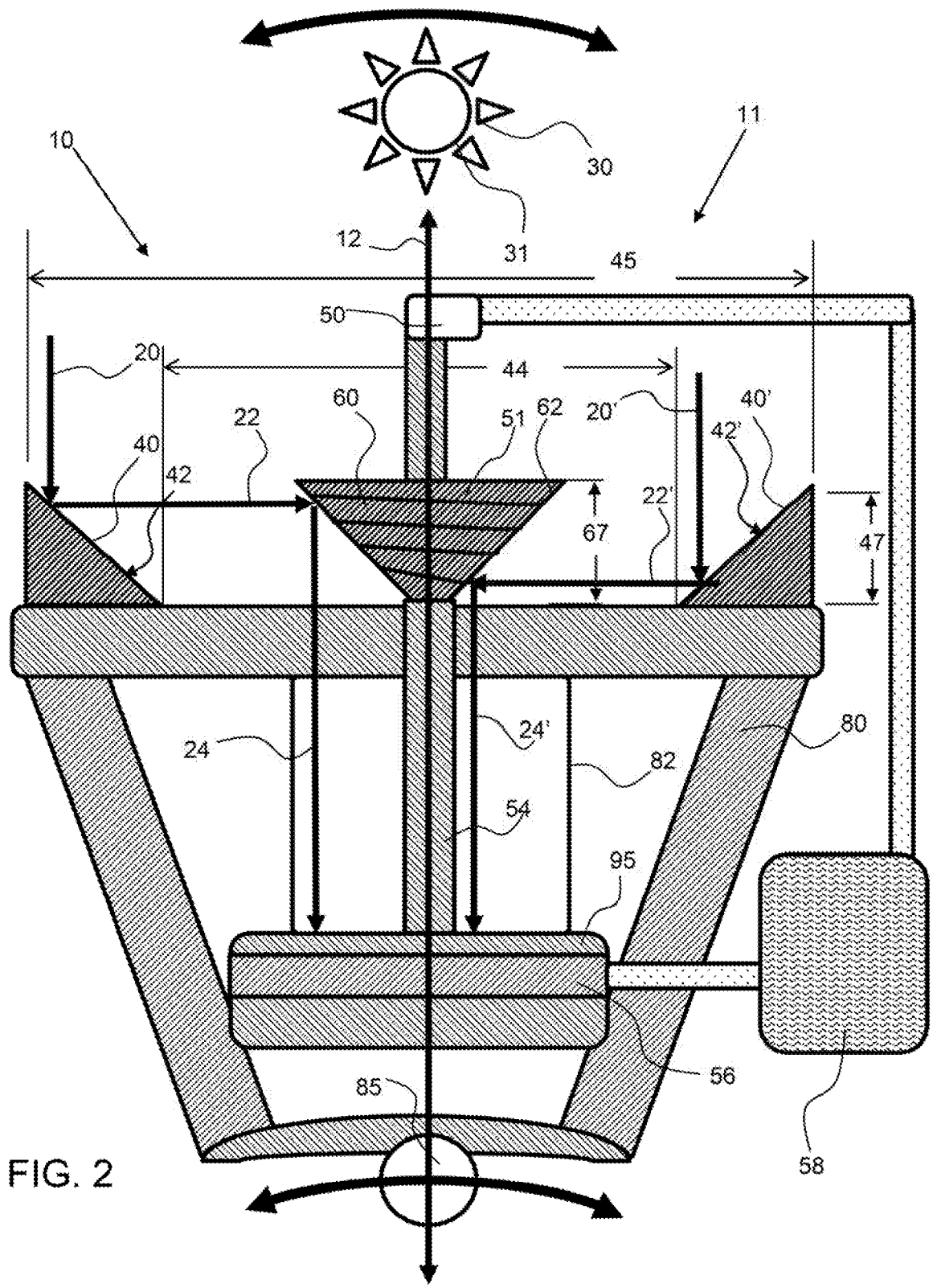
FIG. 2 shows a cross sectional view of the solar collector shown in FIG. 1, along line 2-2.

Referring to FIGS. 1 and 2, an exemplary solar concentrator 10 comprises an outer reflective ring 40 having a reflective surface 42 and an inner reflective cone 60 having a reflective surface 62 and centrally located within the outer reflective ring. Source light 30, from a light source such as the sun 31 travel toward the solar concentrator along a light source axis 20. The source light is then reflected off of a reflective surface 42 of the outer reflective ring 40 in a light reflective axis. Since the reflective surface of the outer reflective ring is configured 45 degrees from the light source axis 20, the reflected light 32 moves orthogonally from the light source axis towards the inner reflective cone, or along the light reflective axis 22. The reflected light is then reflected off of the reflective surface 62 of the inner reflective cone toward the light receiver 95. Since the reflective surface 62 of the inner reflective cone is configured at substantially 45 degrees from the light reflective axis 22, the transmitted light 34 is reflected orthogonally from the reflected light 32, or along the light transmission axis 24, toward the light receiver 95. This unique arrangement enables a large amount of light to be concentrated into a light beam towards the light receiver. The larger the outer reflective ring, or the larger the surface area of this outer reflective ring, the more light will be focused and transmitted toward the light source. The scale and ratio of the outer ring diameter and height with respect to the inner reflective cone can be selected depending on the application. The outer reflective ring has an outer diameter 45, inner diameter 44 and height 47. The inner reflective cone has an outer diameter, or the diameter tangent with the top of the outer reflective ring, or tangent with the outer diameter of the outer reflective ring, and a height 67. In most cases the height of the outer reflective ring and inner reflective cone are the substantially same. The inner reflective cone may be slightly taller to capture any stray light not reflected orthogonally from the outer reflective ring.

A light pipe 82 may be configured to receive transmitted light from the inner reflective cone and may have an inner reflective surface 83. A light pipe may be use to further concentrate the transmitted light and/or to prevent interference with the transmitted light. In some cases, the transmitted light may be very powerful and a light pipe may be used to prevent animals, such as birds, from entering the transmitted light beam and becoming injured.

A solar tracker 85 may be coupled to the outer reflective ring 40 and an inner reflective cone 60 via a support structure 80 and may move the reflective surfaces to track the motion of the sun across the sky, as indicated by the bold arced arrows. The central axis 12 of the solar concentrator may be aligned with the sun, and the light source axis, as it sweeps from east to west throughout the day. The central axis is orthogonal to the light reflective axis, or substantially 45 degrees from the reflective surface of the solar concentrator. As shown in FIGS. 1 and 2, the reflective surfaces of the outer reflective ring and inner reflective cone are parallel or substantially parallel, or within about 5 degrees of parallel and preferably within about 3 or even 1 degree of parallel.

A pump 50 may be configured to pump a processing fluid 52, which may be water and may act as a coolant in the inner reflective cone portion of the solar concentrator. As the processing fluid flows through the inner reflective cone it may become very hot due to all the solar energy reflecting off of the outer surface. As the diameter of the outer reflective ring increase, the more solar energy per unit area the inner reflective cone will receive. Therefore, for large systems, having a large outer diameter ring the processing fluid may act as a coolant to keep the inner reflective ring cool and to prevent damage. The processing fluid may flow through the inner reflective cone and then into a transfer conduit 54 that extends from the inner reflective cone to the light receiver 95. The processing fluid may be heated within the transfer conduit and may extend within light pipe, it may be centrally located along the axis of the light pipe to not block the transmitted light 34. The light receiver may be configured with a manifold 56 or one or more conduit that further heat the processing fluid 52. For example, one or more conduits may spiral from a central location to an outer perimeter of the light receiver to maximize heating of the processing fluid. The processing fluid may exit the light receiver and pass to a power converter, 58, such as a turbine. The processing fluid may be water and it may be converted to super-heated steam that is used to produce power in the steam turbine. The processing fluid may flow from the power converter back to the inner reflective cone 50 and the processing fluid may flow in a closed loop. In an alternative embodiment however, the processing fluid is purged from the system after flowing through the light receiver or the power converter. Cool fluid from a natural source, such as a lake or river, may be used to as the processing fluid and then returned back into the body of water or into a secondary body of water, for example. FIG. 2 show that the processing fluid may flow through conduits 51 within the interior 63 of the inner reflective cone 60. These conduits 51 may spiral around the inner surface to enable maximum cooling benefits and heating of the processing fluid. Likewise, the manifold may comprise one or more conduits that may spiral about the light receiver to enable efficient heating of the processing fluid. The solar concentrator may therefore be part of a power generation system 11, the utilizes solar energy to produce power, such as by heating a processing fluid and using this heated processing fluid to produce power, such as in a steam turbine. Again the processing fluid may be open loop or be configured in a closed loop.

Exemplary power converters may be steam turbines, or boilers such as, but limited to, haycock and wagon top boilers, cylindrical fire-tube boiler, mufti-tube boilers, solid fuel firing, firetube boiler, superheater, water tube boiler, and supercritical steam generator. An exemplary steam turbine may be an impulse turbine or a reaction turbine, for example.

Figure 3:
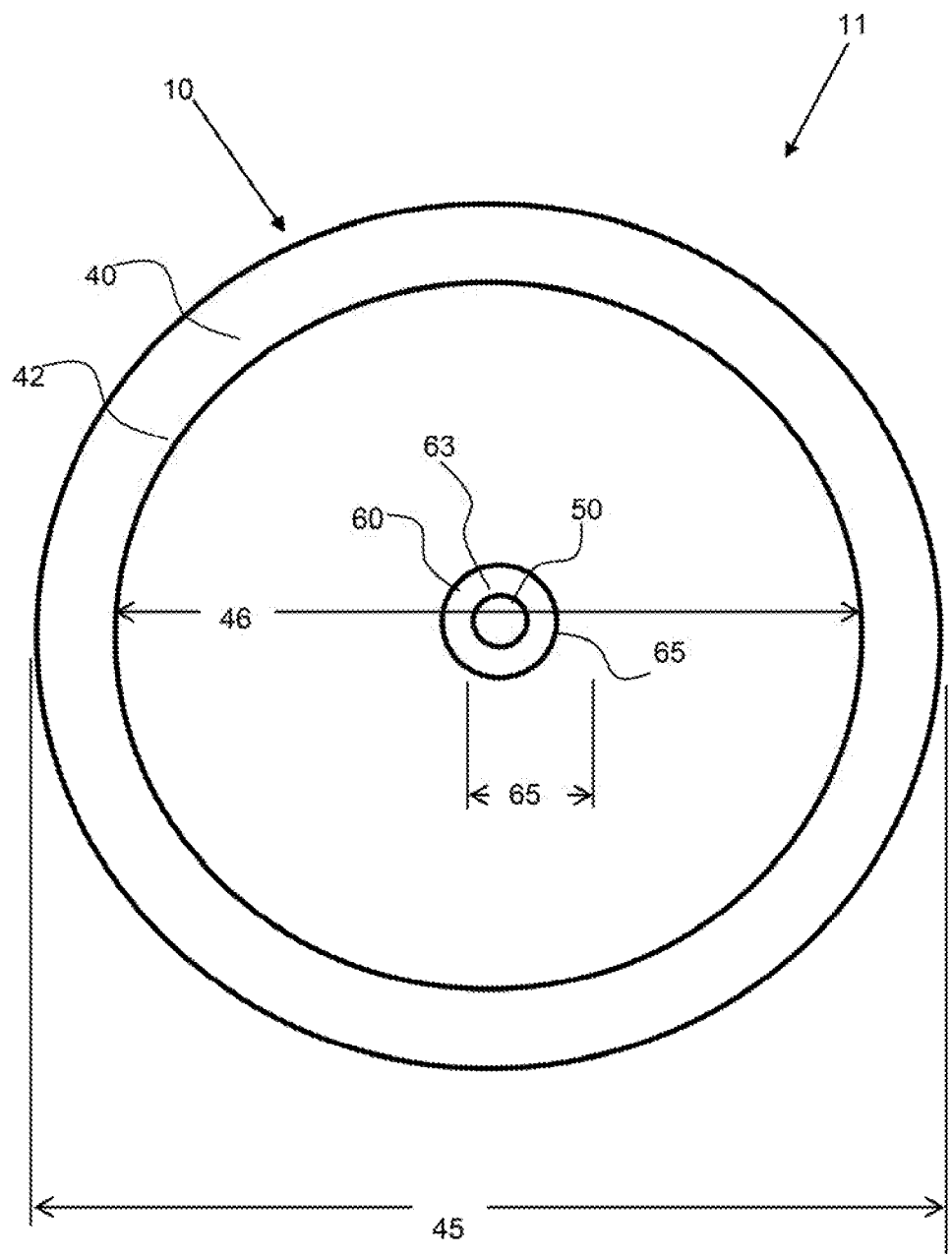
FIG. 3 shows a top view of an exemplary solar concentrator of the present invention.

As shown in FIG. 3, the outer reflective ring 40 may have a much larger outer diameter 45 than the outer diameter 65 of the inner reflective cone 60. The ratio of the diameters of the outer reflective ring to the inner reflective cone, as described herein, may be about 4:1 or more, about 6:1 or more, about 8:1 or more, about 10:1 or more, about 20:1 or more and any range between and including the ratios. Note that the larger the ratio, the more light energy will be concentrated on the inner reflective cone. Higher ratios and intense light may require a coolant to be pumped through the interior 63 of the inner reflective cone by a pump 50 to prevent damage to the inner reflective cone. The inner diameter 46 of the outer reflective cone is shown in FIG. 46. The inner diameter will depend on the height of the outer ring and can be computed using these values as the reflective surface of the outer reflective ring is substantially 45 degrees.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A solar concentrator comprising:
   a) a light reflective axis;
   b) a light transmission axis;
   c) an outer reflective ring having a reflective surface that is substantially 45 degrees from a light source axis; wherein the outer reflective ring has a diameter of at least 3 meters;
   d) an inner reflective cone having a reflective surface that is substantially 45 degrees from the light reflective axis and centrally located within the outer reflective ring;
      wherein the outer reflective ring is configured to produce a reflected light by reflecting a source light from a light source, that is substantially orthogonal to the light reflective axis, toward the inner reflective cone; and
      wherein the inner reflective cone is configured to produce a transmission light by reflecting the reflected light toward a light receiver;
      wherein the outer reflective ring has a reflective surface area of at least 3.0 m$^2$, a light pipe extending along the light transmission axis from the inner reflective cone to a light receiver;
   a transfer conduit extending within the light pipe from the inner reflective cone; and
   a processing fluid that is heated by the solar concentrator and flows through the transfer conduit.

2. The solar concentrator of claim 1, wherein the outer reflective ring is a ring around the inner reflective cone.

3. The solar concentrator of claim 1, wherein the processing fluid comprises water and wherein said processing fluid is transferred to a power converter to produce electrical power.

4. The solar concentrator of claim 2, wherein the Dower converter is a steam turbine and wherein the processing fluid flows in a closed loop from the power converter to the transfer conduit.

5. The solar concentrator of claim 1, wherein the height to diameter ratio of the outer reflective ring is no more than about 0.5.

6. The solar concentrator of claim 1, wherein the transmitted light along the light transmission axis is transmitted away from the light source.

7. The solar concentrator of claim 1, wherein the transfer conduit is coupled with the inner reflective cone and wherein the processing fluid is heated by the inner reflective cone as it flows through the inner reflective cone.

8. The solar concentrator of claim 1, wherein the light pipe has reflective surfaces on the interior surface of the light pipe.

9. The solar concentrator of claim 1, wherein the outer reflective ring and the inner reflective cone are couple to a support frame,
   wherein the light source is the sun, and
   wherein the solar concentrator further comprises a solar tracker coupled to the support frame and configured to move the support frame to track the sun.

10. The solar concentrator of claim 1, further comprising a coolant pump that pumps a coolant into an interior of the inner reflective cone.

11. A method of concentrating solar energy comprising:
   a) providing a light source that produces light having a light source axis;
   b) providing a solar concentrator comprising:
      i) a light reflective axis;
      ii) a light transmission axis;
      iii) an outer reflective ring having a reflective surface that is substantially 45 degrees from alight source axis, wherein the outer reflective ring has a diameter of at least 3 meters;
      iv) an inner reflective cone having a reflective surface and centrally located within the outer reflective ring, wherein the inner reflective is substantially 45 degrees from the light reflective axis;
    v) a light receiver;
wherein the outer reflective ring has a reflective surface area of at least 3.0 m$^2$,
    vi) a light pipe extending along the light transmission axis from the inner reflective cone to a light receiver;
    vii) a transfer conduit extending within the light pipe from the inner reflective cone; and
c) reflecting the light from the light source off of the reflective surface of the outer reflective ring to produce a reflected light that is transmitted along said light reflective axis to the inner reflective cone;
d) reflecting the reflected light off of the inner reflective cone to produce a transmitted light that is transmitted along said light transmission axis to the light receiver;
e) providing a processing fluid that is heated by the solar concentrator and flows through the transfer conduit.

12. The method of concentrating solar energy of claim 11, wherein the outer reflective ring is ring around the inner reflective cone.

13. The method of concentrating solar energy of claim 11, wherein the processing fluid comprises water and wherein said processing fluid is transferred to a power converter to produce electrical power.

14. The method of concentrating solar energy of claim 13, power converter is a steam turbine and wherein the processing fluid flows in a closed loop from the power converter to the transfer conduit.

15. The method of concentrating solar energy of claim 11, wherein the height to diameter ratio of the outer reflective ring is no more than about 0.5.

16. The method of concentrating solar energy of claim 11, wherein the transmitted light along the light transmission axis is transmitted away from the light source.

17. The method of concentrating solar energy of claim 11, wherein the transfer conduit is coupled with the inner reflective cone and wherein the processing fluid is heated by the inner reflective cone as it flows through the inner reflective cone.

18. The method of concentrating solar energy of claim 11, wherein the light pipe has reflective surfaces on the interior surface of the light pipe.

19. The method of concentrating solar energy of claim 11, wherein the outer reflective ring and the inner reflective cone are couple to a support frame,
    wherein the light source is the sun, and
    wherein the solar concentrator further comprises a solar tracker coupled to the support frame and configured to move the support frame to track the sun.

20. The method of concentrating solar energy of claim 11, further comprising providing a coolant pump that pumps a coolant into an interior of the inner reflective cone.

* * * * *